United States Patent
Telliard et al.

[11] 3,908,235
[45] Sept. 30, 1975

[54] REMOVABLE SNAP FASTENER

[76] Inventors: Gregory Alan Telliard, 12380 Crestwood Drive, Yucaipa, Calif. 92399; David Michael Hamilton, 18573-13th St., Bloomington, Calif. 92316; Gary Edward Chaplin, 295 E. Ceres St., Rialto, Calif. 92376

[22] Filed: Dec. 2, 1974

[21] Appl. No.: 528,921

[52] U.S. Cl. .......................... 24/73 P; 85/5 R; 85/80
[51] Int. Cl.² .................. A44B 21/00; F16B 19/00
[58] Field of Search ..... 85/5 R, 80; 24/73 P, 73 PF, 24/201 S, 201 SL, 110, 230 R, 230 B, 230 SL, 230 F, 230 C F

[56] References Cited
UNITED STATES PATENTS

| | | | |
|---|---|---|---|
| 623,701 | 4/1899 | Brisselet | 24/230 SL UX |
| 732,245 | 6/1903 | Weiss | 85/5 R UX |
| 926,568 | 6/1909 | Huey | 85/5 R UX |
| 1,557,526 | 10/1925 | Hartmann | 85/5 R UX |
| 1,938,996 | 12/1933 | Brewster | 24/110 |
| 2,451,591 | 10/1948 | Tinnerman et al. | 85/5 R X |
| 3,693,494 | 9/1972 | Meyer | 85/5 R |
| 3,713,678 | 1/1973 | McLarty | 85/5 R |

*Primary Examiner*—Donald A. Griffin
*Attorney, Agent, or Firm*—Herbert E. Kidder

[57] ABSTRACT

A one-piece, resilient snap-fastener, preferably molded of plastic, having an elongated, generally cylindrical shank which is split longitudinally for a portion of its length, forming upper and lower fingers. The lower finger is smooth from end to end, while the upper finger has one or more laterally projecting catches adapted to engage the marginal edge of an opening in a member through which the shank of the fastener is inserted. The fastener is also provided with a longitudinally extending slot in the upper finger, which includes an inclined ramp terminating in a shoulder. A removal tool is provided, which may be inserted into the said slot, said tool having a hook on its outer end. As the tool is inserted into the slot, it slides over the inclined ramp, causing the free end of the upper finger to be depressed, so as to release the catch. The hook on the tool engages the shoulder at the end of the inclined ramp, and the released snap-fastener can then be removed from the opening with the tool.

6 Claims, 8 Drawing Figures

U.S. Patent   Sept. 30, 1975   3,908,235
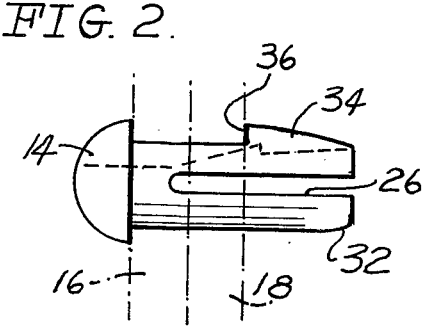
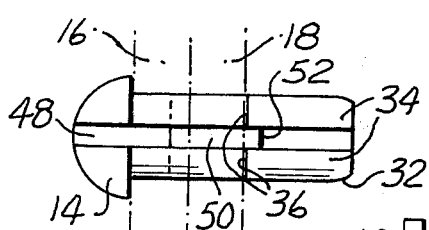
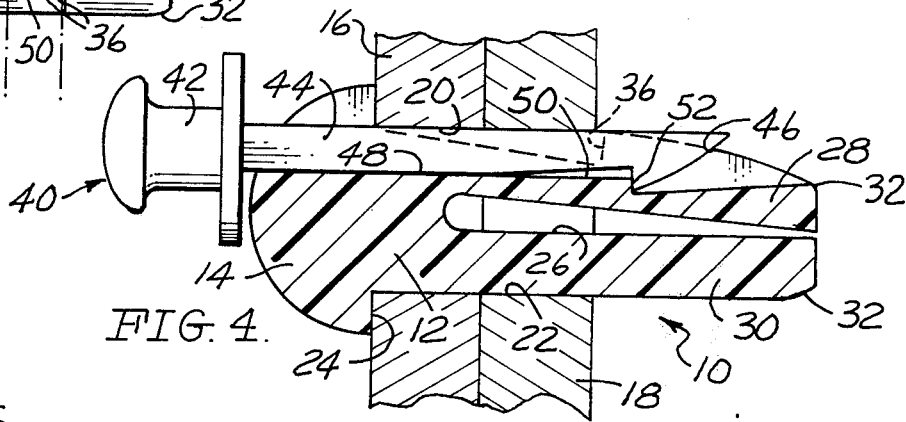
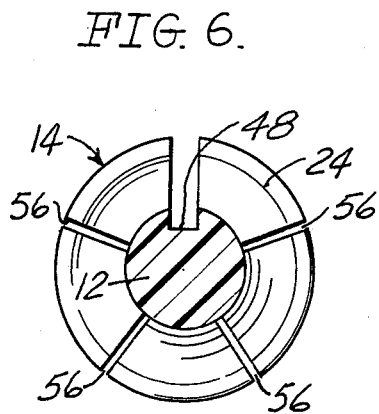
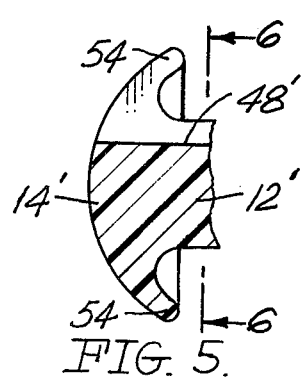
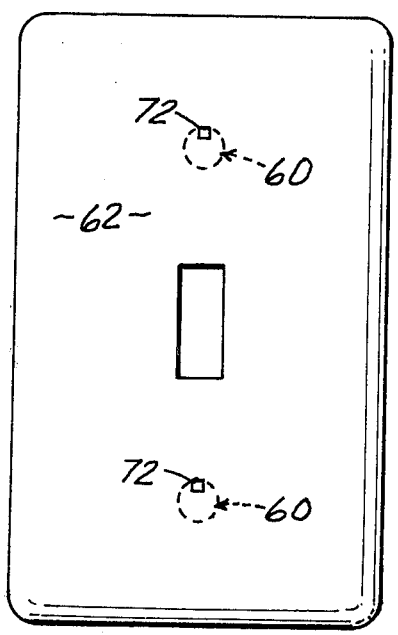
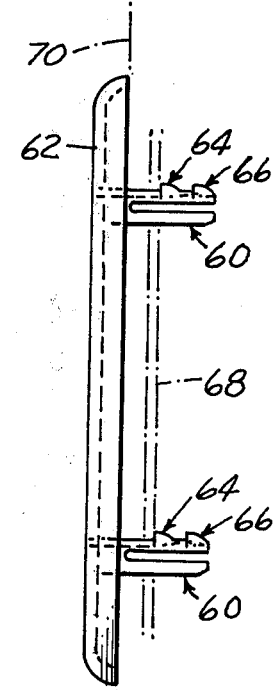

REMOVABLE SNAP FASTENER

BACKGROUND OF THE INVENTION

The present invention pertains to snap fasteners, and more particularly to that class of fasteners having a resilient shank, which is adapted to be inserted through an opening in a sheet-like member, more or less in the manner of a screw or rivet, and which has a catch on one side of the shank that engages the marginal edge of the opening on the back side of the said sheet-like member. The snap fastener of the present invention may be used to fasten two sheet-like members together, or it may be formed as an integral part of a member, such as a switch plate, which is to be fastened to a sheet-like bracket, or wall box.

Various snap fasteners have been proposed in the past, but none of them, to the best of our knowledge, has been capable of being removed from the front side without destroying the fastener and, in many cases, damaging one or more of the parts held together. The term "front side" refers to that side of the sheet-like member on which the shank of the fastener entered the opening. In the case of a simple fastener, there will be a head on one end of the shank which abuts against the front side of one of the two members being joined together, while the catch adjacent the other end of the shank engages the back side of the other member.

Heretofore, snap fasteners with positive locking action have been releasable only by manually disengaging or releasing the catch from the back side of the one sheet-like member. This requires that the back side of the said one sheet-like member be readily accessible, but in many cases this is not true. Thus, if the operator cannot get at the back side of the one member to disengage the catch, the fastener cannot be released, and must be destroyed.

Other fasteners have been proposed that utilize a spring-biased detent, which is projected laterally from one side of the shank and protrudes from the shank on the back side of the member through which it is inserted. Such fasteners are removable by forcibly pulling them out of the said member, causing the spring-biased detent to yield inwardly until it clears the opening. The disadvantage of this type of snap fastener is that it does not provide a positive locking action, and may become released when the separating force exceeds the holding power of the spring-biased detent.

SUMMARY OF THE INVENTION

The primary object of the present invention is to provide a simple, inexpensive snap-fastener that is convenient and easy to use; that provides a positive locking action; and that is readily removable with a simple tool provided for the purpose.

Another object of the invention is to provide a removable snap fastener that is versatile, and can be molded integrally with parts such as switch wall plates, electrical outlet socket plates, and the like, so that the said plates can be quickly installed by merely pressing them into place, without having to handle screws or other fasteners.

Other objects and advantages of the present invention will become apparent to those skilled in the art from the following detailed description, of the preferred embodiment thereof, with reference to the accompanying drawings.

BRIEF DESCRIPTION OF THE DRAWINGS

FIG. 1 is a perspective view of a removable snap-fastener embodying the principles of the present invention;

FIG. 2 is a side elevational view of the same, showing the fastener holding two sheet-like members together;

FIG. 3 is a top plan view of the fastener in FIG. 2;

FIG. 4 is an enlarged sectional view through the fastener, showing the removal tool inserted into the slot provided for it, with the hook on the end of the tool engaging the shoulder on the fastener;

FIG. 5 is a sectional view through the head end of a slightly modified form of snap fastener, in which the head is cupped, or bowed, so that when pressed firmly against the workpiece, the head is deformed and exerts resilient pressure against the workpiece, thereby taking up any clearance;

FIG. 6 is a sectional view, taken at 6—6 in FIG. 5;

FIG. 7 is a front view of an electrical switch wall plate embodying the invention; and FIG. 8 is a side elevational view of the same.

DESCRIPTION OF THE PREFERRED EMBODIMENTS

In FIGS. 1 to 4 of the drawings, the snap-fastener of the present invention is designated in its entirety by the reference numeral 10, and comprises a shank 12 having an enlarged head 14 at one end thereof. The fastener 10 is particularly adapted to be molded of tough but resilient plastic material such as ABS, Delrin, nylon, and the like. Fastener 10 is designed to hold two sheet-like members 16 and 18 together, as shown in FIGS. 2, 3, and 4, and therefore has more or less the same function as a sheet metal screw, nut and bolt, or rivet. Sheet-like members 16 and 18 have holes 20 and 22 provided therein, which are aligned with one another, and the shank 12 is inserted through the aligned holes. The head 14 has a shoulder 24 on its underside, and this shoulder seats against the outer surface of sheet-like member 16 around the margins of the hole 20.

The shank 12 of the fastener is preferably cylindrical in configuration, and is divided for the greater part of its length by a diametral slit 26, forming an upper finger 28 and a lower finger 30. Both the upper finger 28 and lower finger 30 are tapered slightly at 32 to facilitate inserting the shank into the holes 20, 22. Lower finger 30 is smooth-sided for its entire length, and is uniform in cross-sectional area.

The upper finger 28 is provided on its outer end with a conical nose portion 34 which projects laterally outward from the cylindrical surface of the finger, and which has a vertical shoulder 36 that is adapted to engage the outer surface of sheet-like member 18 around a portion of the marginal edge of hole 22, when inserted through the members 16, 18, as shown in FIG. 2.

When the fastener 10 is pushed into the aligned holes 20, 22, the conical nose portion 34 cams the upper finger 28 downwardly, bending the finger in the area near the bottom end of diametral slit 26. The upper finger 28 is bent downwardly far enough to allow the conical nose portion 34 to enter and pass through the holes 20, 22. When the fastener is fully inserted, with shoulder 24 on the head 14 seated against the outer surface of member 16, shoulder 36 clears the back surface of member 18, and the upper finger 28 is released so that it snaps outwardly to the position shown in FIG. 2. In this position, shoulder 36 is seated solidly against the outer surface of member 18, and the two members 16, 18 are positively locked together in a grip that cannot be released except by shearing the conical nose portion 34 off the finger 28.

The snap-fastener 10 can be released, however, by using a release tool 40 (FIG. 4) having a finger grip head 42, long slender shank 44, and hook 46 on the outer end of the shank. Fastener 10 is provided with a longitudinally extending slot 48 formed in the top side of the upper finger 28 and extending all the way from one end of the fastener to the other.

Slot 48 forms a radial gap in the head 14, and another radial gap in the conical nose portion 34. In the bottom of slot 48 near the midpoint of shank 12 is an inclined ramp 50, which terminates in a shoulder 52.

The leading end of the shank 44, forming the hook 46, is pointed and has a sloping underside which slides smoothly over the bottom of slot 48, and over inclined ramp 50 when the shank is inserted into slot 48 from the head end of the fastener. The top edge of the shank 44 slidingly engages the inner surfaces of holes 20, 22, and as the hook 46 rides up the inclined ramp 50, it cams the upper finger 28 downwardly, causing the shoulder 36 to be depressed until it clears the edge of hole 22. When the release tool is inserted all the way into the fastener 10, hook 46 drops down behind shoulder 52, and the tool 40 and released fastener 10 can then be withdrawn from the holes 20, 22 by pulling on the finger grip head 42. When extracted in this way, the fastener is undamaged, and can be used over and over again.

If it should be necessary to exert a slight clamping pressure on the members 16, 18 so as to take up any clearances, the head of the fastener can be made as shown in FIGS. 5 and 6. In this embodiment, the head 14' is made with a cup-shaped configuration, the overhanging edge of which is divided by a plurality of angularly spaced, radial slits 56 forming resilient ears 54 that can be elastically deformed by flattening them against the outer surface of member 16 when the fastener is pressed all the way into holes 20, 22. This elastic deformation of the ears 54 exerts a slight pressure against members 16, 18, tending to clamp them together under spring pressure, so that any unwanted clearances are taken up.

Another embodiment of the invention is shown in FIGS. 7 and 8. In this embodiment, snapfastener shanks 60 are molded into the back side of a switch plate 62, and form an integral part of the switch plate. The fastener shanks 60 are essentially the same as the shank of fastener 10, except that two conical catches 64 and 66 are provided on the shank, so that one or the other can engage a sheet-like member 68 in a wall box at either of two levels. When clamped to member 68, switch plate 62 is held flat against wall 70, as shown in FIG. 8.

Each of the shanks 60 has a slot formed in the top side of the upper finger, and this slot opens through the switch plate 62 in the form of two small holes 72. The release tool 40 is inserted through holes 72 to disengage the fastener catches 64 or 66 from the member 68.

The advantage of the switch plate shown in FIGS. 7 and 8 is that it does not require separate mounting screws, which can become lost, and mounting the plate on the wall consists merely in placing the plate so that the shanks 60 are lined up with holes in member 68 and then pushing the plate against the wall. Fasteners 60 snap into place, and the switch plate is positively locked in place until released by using the tool 40.

While we have shown and described in considerable detail what we consider to be the preferred form of the invention, it will be understood by those skilled in the art that the invention is not limited to such details, but might take various other forms within the scope of the following claims. In the claims, the term "front side" referes to that side of the members 16, 18 against which head 14 lies, or in the case of the switch plate of FIGS. 7 and 8, the side of the switch plate facing into the room,

What we claim is:

1. A releasable snap-fastener for securing two members together, at least one of said members having a hole provided through which the fastener is inserted, said snap-fastener comprising an elongated, resilient shank having a diametral slot formed in one end thereof and extending for a substantial portion of the length thereof, said slot dividing said shank into two parallel fingers, one of said fingers being smooth-sided, and the other finger having a catch formed thereon which is adapted to engage the marginal edge of said hole in said one member, said other finger being bent toward said one finger when the shank is inserted through said hole, and said catch springing laterally outward to engage the marginal edge of said one member when the shank is inserted all the way into said hole; said other finger having a longitudinally extending groove formed in the outer side thereof, with an inclined ramp adjacent said catch, said groove extending from one end of said snap-fastener to the other and being adapted to receive a long, slender release tool which may be inserted endwise into the slot from the front end of the fastener, said tool being adapted to slidingly engage said inclined ramp and thereby cam said other finger downwardly, so that said catch is disengaged from said member, allowing the fastener to be withdrawn from said hole.

2. In combination, a releasable snap-fastener as defined in claim 1, and a release tool therefor, said release tool having a long, slender shank with a finger-grip head at one end thereof, the other end of said shank being insertable endwise into said groove from the front end of the fastener.

3. The combination as set forth in claim 2, wherein said inclined ramp terminates in a shoulder, and said release tool has a hook on said other end thereof which engages said shoulder so that the released fastener can be withdrawn from its hole by the release tool.

4. The invention as set forth in claim 1, wherein the other of said members has at least one snap-fastener shank molded integrally therewith, said snap-fastener shank being insertable into said hole in said one member to join said members together.

5. A snap-fastener as set forth in claim 1, wherein said two members are sheet-like members with matching holes provided therein which are registered with respect to one another, and wherein said shank has a head formed on the other end thereof, said head bearing against the outer surface of one member and said catch engages the opposite surface of the other member; said groove extending through said head so that said release tool can be inserted endwise into the slot from the head end of the fastener to release the same.

6. A snap-fastener as set forth in claim 1, wherein said catch is a conical protuberance on the side of said other finger opposite said diametral slot, said conical protuberance terminating in a shoulder which engages the surface of said one member around a portion of the margin of said hole.

\* \* \* \* \*